United States Patent [19]

Engstrom

[11] Patent Number: 4,691,428

[45] Date of Patent: Sep. 8, 1987

[54] SPANNER FOR TORSION SPRINGS AND METHOD FOR ITS USE

[76] Inventor: David A. Engstrom, R.D. 2, Sugar Grove, Pa. 16350

[21] Appl. No.: 851,454

[22] Filed: Apr. 14, 1986

Related U.S. Application Data

[63] Continuation-in-part of Ser. No. 647,844, Sep. 6, 1984, abandoned.

[51] Int. Cl.[4] .............................................. B23P 19/04

[52] U.S. Cl. ...................................... 29/426.6; 29/227; 81/68

[58] Field of Search ................. 81/176.1, 176.2, 176.3, 81/68; 29/227, 426.5, 426.6

[56] References Cited

U.S. PATENT DOCUMENTS 1,504,847 8/1924 Tarr .................................... 81/176.3
1,528,691 3/1925 Price et al. ......................... 81/176.3
4,142,283 3/1979 Walker et al. ........................ 29/227

FOREIGN PATENT DOCUMENTS 714570 12/1941 Fed. Rep. of Germany ..... 81/176.1

*Primary Examiner*—Roscoe V. Parker
*Attorney, Agent, or Firm*—Stephen A. Littlefield

[57] ABSTRACT

Disclosed is a spanner wrench for and method of removing a torque-locked torsion spring from a winding cone. The wrench retrieves and engages the terminal end of the spring to apply both a radially outwardly directed force to such terminal end of the spring while simultaneously applying a tangentially-directed force which is counter to the torque lock to remove the spring from the cone without damage to the cone. In its preferred form the wrench is adjustable so as to be able to accommodate spring and cone assemblies of widely varying diameters.

6 Claims, 2 Drawing Figures

SPANNER FOR TORSION SPRINGS AND METHOD FOR ITS USE

This is a continuation-in-part of my co-pending application Ser. No. 647,844, filed Sept. 6, 1984, and now abandoned.

This invention relates generally to the art of overhead doors and, more specifically, to a device which facilitates the disassembly of a torsion spring from its winding cone in a door counterbalance system.

BACKGROUND OF THE INVENTION

It is necessary to incorporate a counterbalancing force against the total weight of an overhead door to overcome the force necessary to raise the door. Such counterbalancing force may be provided by an extension-type spring in the lift track of the door, or more commonly, a torsion spring from which the door is fully suspended. Torsion springs store, as potential energy, all of the door's weight as a torsional wind on the spring. The torsion spring is mounted to a tapered, helically-groove body or "cone", which when threaded into the end of the spring, expands the spring inside diameter beyond its normal size thus creating torsional lock upon its cone. The torsion spring is coiled around a rotatably mounted horizontal shaft with one end of the spring being mounted to a non-rotating and rigidly mounted stationary cone. The other end of the spring is fitted with a winding cone. When the spring has been wound to its proper amount of turns by the winding cone, the cone is then locked to the shaft with set screws. A cable drum is also mounted on the shaft and the door is suspended by cables wound around the drums. As the door is lowered, the cable unwinds from the drum causing rotation of the shaft. Torsion force is thus applied to the torsion spring, a force which then helps to overcome the weight of the door when it is later raised.

Because of the mounting of the torsion spring on the tapered cone, it is inherent in its design that the spring will become tightly locked into the helical grooves of the cone through repeated, cyclic use. When it becomes necessary to remove the spring, the tight locking of the spring to the cone makes such disassembly extremely difficult or impossible, often entailing the destruction the the cone. Springs are usually mounted in pairs sharing a common stationary double mounting cone which is relatively expensive to replace.

The problem of spring removal has been addressed using a a torch, slip-jointed pliers, hammer and chisel, pipe wrenches and spanner wrenches. Torches almost always destroy the cone because cones are usually made of sand cast or die cast aluminum. Slip-joint pliers and pipe wrenches are often useless because of limited working clearance so that they can not be effectively applied to the terminal end of the spring.

A hammer and chisel are sometimes effective for spring removal if the terminal end of said spring, especially on the double stationary mounting cone, is in a suitable position so that the necessary blow to break the spring loose from its cone can be delivered. However, when the terminal end of one of the springs can not be accessed due to clearance limitations, the matching torsion spring must be unwound and the entire torsion shaft, springs, and cable drums must be dismantled and removed in order to repair or replace one spring.

Spanner wrenches which are primarily designed for the removal of notched spanner nuts are not suitable because there is no provision to prevent tangential or lateral movement of the claw resulting in tool slippage. Furthermore, conventional spanner wrenches, whether fixed or adjustable, tighten in a clamping action around the spring, making removal even more difficult.

U.S. Pat. No. 4,142,283 describes a wrench which is specially adapted for use in removing torsion springs from a winding cone. The wrench comprises a ring or C-shaped collar and a radially-oriented adjustable pin. In use, the collar is placed around the spring and cone and the pin is adjusted so as to engage the terminal end of the spring on the cone. Torque is then applied to the ring by a lever arm in order to overcome the torsion lock which the spring has developed on the cone through use.

While this specialized tool is an improvement over the use of a pipe wrench or the like, the fixed ring or C-shape of the wrench requires that the user have a number of variously sized C-rings available in order to accomodate cones and springs of different diameters. Additionally, this C-ring wrench requires free access over a coneless end of a spring for removal. If the spring is not broken and cone removal is desired, the spring must be cut with a torch to achieve access to cone. Finally, a radially-oriented pin the collar is used to apply a tangentially directed force against the terminal end of the spring. This is an ineffective means of force transfer because it does not lift the spring's terminal end from cone, thus resulting in the probable gouging of cone and damaging of the threads.

Spanner-type wrenches are also known. U.S. Pat. Nos. 1,504,847 and 1,528,691 are typical of spanner wrenches adapted to remove large diameter threaded nuts from a threaded cylindrical body. In operation, these spanner wrenches apply a tangentially-directed force to a notch in the nut through the action of a claw or pawl engaging the notch. The claw or pawl is generally flexibly connected to a lever arm which engages the opposite side of the nut and forms a fulcrum against which torque is applied to the device along the lever arm. The aforementioned U.S. Pat. No. 1,528,691 adds a feature of length adjustability to the claw connection to the lever arm in order to accomodate nuts of different diameters with the same wrench.

A major concern in the use of any of these devices is operator safety. The sudden breaking or release of a wrench or chisel or plier can result in direct injury to arms and hands of the operator as well as injury from objects propelled by the spring itself. None of the above devices positively engages the spring end to prevent lateral or radial slippage and release of the spring end once torque is applied.

SUMMARY OF THE INVENTION

The present invention provides a means and method for safely and easily retrieving the terminal end and removal of a torsion spring from its winding cone through the application of both radially—and tangentially—oriented forces to the terminal end of a torsion spring utilizing a single, universally adjustable tool.

In accordance with the invention, a spanner wrench incorporates a lever claw having non-slip pocket which positively engages a spring end for lifting a spring's terminal end radially outwardly away from a cone member while simultaneously applying a tangentially-directed expanding force to the spring to overcome torque lock of the spring member on the cone member.

Further in accordance with the invention, a torsion spring spanner wrench comprises a lever arm, a fulcrum, and a lever action claw member having a cup form recess adapted to receive a spring end and which is connected to the lever arm by means of roller chain.

Further in accordance with the invention, the above described roller chain is affixed to the middle of the claw which allows a tail portion of the claw to rest upon a second link of the chain which becomes the fulcrum of the lever action of the claw. As force is applied by lever arm through the chain to the lever acting claw member, the claw flattens out against the spring which compels the leading edge of the claw to creep under the stub end of the spring thus forcing said stub end into the recessed pocket of the claw preventing any tool slippage whatsoever. With the stub end of the spring securely held in the claw pocket, additional force is applied to handle when then expands the spring to a greater inside diameter thus relieving the torsionally locked spring from its cone. Additionally, the curved nose of the claw will follow the threads of the cone as the spring is being wound off thus preventing any gouges in the cone threads.

It is therefore an object of this invention to provide a single adjustable spanner wrench which retrieves, causes an outward lever action by the claw member, securely holding, expanding and removing a torsionally locked spring from its cone member while providing a vehicle for the rough stub end of the spring in order to prevent cone gouging.

It is yet another object of this invention to provide an adjustable spanner wrench which positively engages the end of a torsion spring so that an operator can safely disassemble spring and cone assemblies of largely varying diameter even in the most limited clearance conditions.

BRIEF DESCRIPTION OF THE DRAWINGS

These and other objects of the invention are accomplished through the manner and form of the present invention to be further described hereinafter in conjunction with a description of a preferred embodiment of the invention illustrated in the accompanying drawings which form a part of this specification and in which.

DETAILED DESCRIPTION OF THE PREFERRED EMBODIMENT AND THE DRAWING

Figure 1:
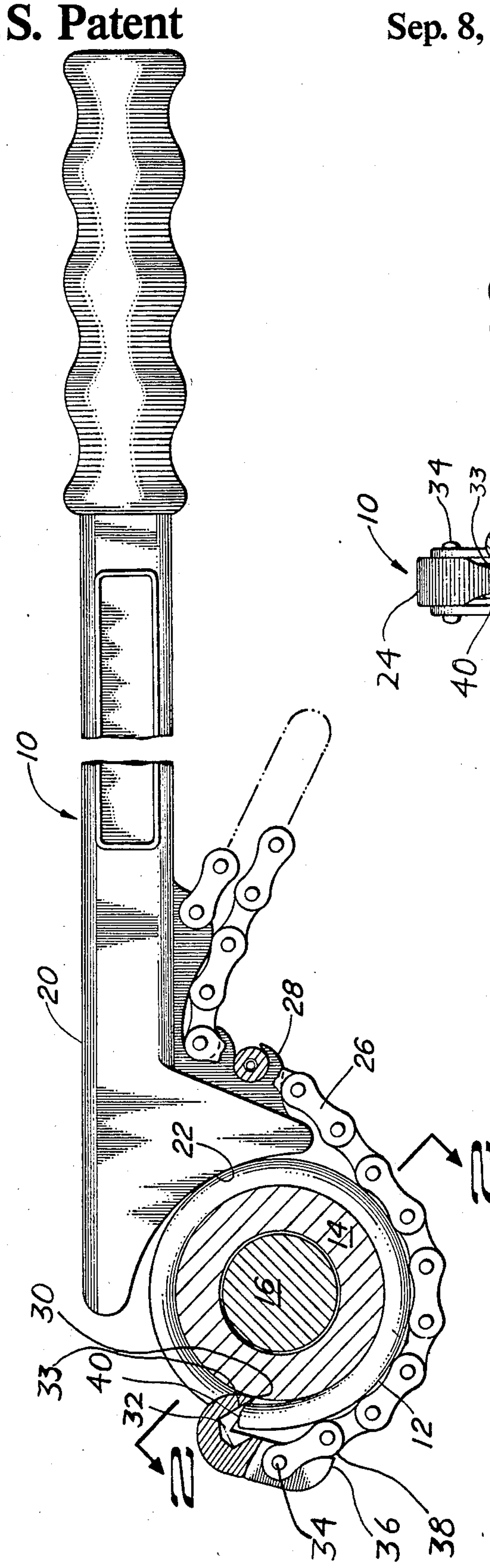
FIG. 1 is a side elevation view of a preferred embodiment of the spanner wrench of this invention shown in use on a spring and cone assembly which is shown in cross section.
Figure 2:
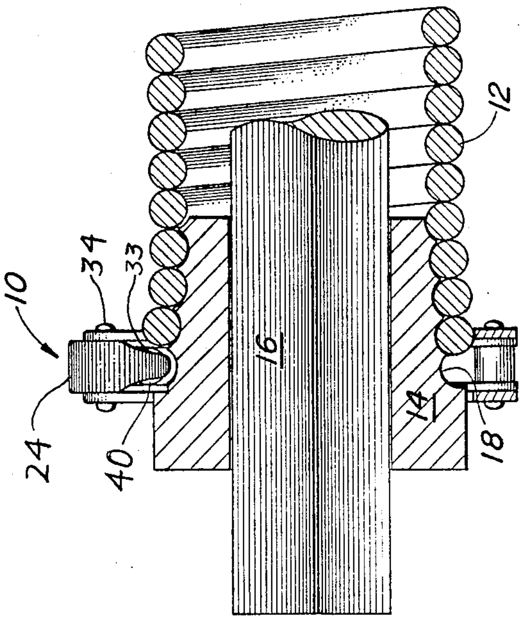
FIG. 2 is a cross-sectional view of the wrench and spring and cone assembly shown in FIG. 1 taken along line 2—2 thereof.

Referring now to the drawings wherein the figures are presented for the purpose of illustrating a preferred embodiment of the invention only and not for the purpose of limiting same, FIGS. 1 and 2 show a wrench 10 for removing a torsion spring 12 from its winding cone 14. The winding cone 14 is fixedly attached to the rotating shaft 16. The spring 12 is wound into helical grooves 18 of the cone 14 and is torque locked thereto through engagement of the radially inward surface of the spring 12 with the oversized radially outward surface of the cone 14 in the tapered helical grooves 18. When the spring is wound to its working potential, the inside diameter of the spring 12 is further decreased thus firmly locking the spring 12 to the cone 14. When it becomes necessary to remove the spring 12 because of spring failure or an erroneously installed spring, the spring 12 is in a torsionally locked state on its cone 14 and is very difficult to remove.

The wrench 10 comprises a lever arm or bar 20 having a concave curved end surface 22 which bears against the outer surface of the spring 12 as a fulcrum. In accordance with the invention, a claw member 24 is connected to the lever arm 20 by means of a flexible element such as a roller chain 26. In its preferred form which allows the wrench 10 to be adjusted to fit a variety of cone and spring diameters, the chain 26 connects to the lever arm 20 by means of a plurality of teeth 28 which engage the chain 26 between its link. It will be understood that chain linkage of the claw 24 to the lever arm 20 is merely preferred and that other connections which allow the claw 24 to span the diameter of the spring and cone assembly may be employed.

In accordance with the invention, the claw 24 has a curved leading edge 30 which is the onset of the claw pocket 32. The chain 26 is attached to the claw 24 at about the middle of the claw at point 34 allowing the tail 36 of the claw 24 to rest upon the second chain roller 38. In this manner the second chain roller 38 becomes a fulcrum for the claw 24. As force is applied lever arm 20 through the chain 26, the leading edge 30 of the claw 24 starts to creep under the stub end 40 of the spring 12. The more resistance spring 12 has to being removed from cone 14, the closer the piviot point 34 of the claw 24 moves toward spring 12. With the claw tail 36 engaging the second chain link 38, the leading edge 30 of the claw 24 creeps further under the stub end 40 of the spring 12, thus forcing stub end 40 of the spring 12 into claw pocket 32. Thus expanding and lifting spring 12 radially and tangentially from cone 14 when a sufficient force is applied by lever arm 20.

Once spring 12 has been broken loose from its cone 14, the curved face 33 of claw 24 provides a vehicle that will follow the helical grooves 18 of the cone 14 preventing gouging or stripping of the cone threads.

In the operation of wrench 10, the stub end 40 of the spring 12 becomes lodged in the claw pocket 32. The pocket 32 completely surrounds the stub end 40 thereby positively engaging the end 40 and preventing lateral slippage, tangential slippage is prevented by the claw tail 36. This positive engagement eliminates the possibility of any catastrophic spring release which can result in operator injury. With the spring 12 removed from the undamaged cone 14, the cone can be reused rather than replaced thereby reducing the cost of spring replacement on an overhead door.

In its most preferred form, the recessed wedge-form claw pocket 32 has a concave shape which will more closely conform with the end of a round spring thereby centering itself over the stub end 40 and in conjunction with the claw tail 36 and the second chain roller 38 combine to create a secondsry lever-fulcrum action on the stub end 40 of spring 12, drawing it away radially from cone 14.

It should be further noted that with the tail 36 of the claw 24 engaging the second chain roller 38 that the claw 24, is prevented from rotating backwards, a common cause of claw slippage such as could be encountered in the use of conventional chain type spanner wrenches.

From the foregoing, it can be seen that the above-described invention provides a means and a method for easily and safely removing a torsion spring 12 from its winding cone 14 utilizing a single easily adjustable spanner wrench 10. The wrench 10 incorporates a lever acting claw 24 for lifting and holding the stub end 40 of a spring 12 radially outward from cone 14 while simultaneously applying a torsional force to spring 12 to counteract the torque lock of spring 12 on cone 14. A claw pocket 32 surrounds the spring stub end 40 to positively engage it and prevent lateral slippage and consequent operator injury.

While the invention has been described in the more limited aspects of a preferred embodiment thereof, other embodiments have been suggested and still others will occur to those skilled in the art upon a reading and understanding of the foregoing specifications. It is intended that all such embodiments be included within the scope of the invention as limited only the the appended claims.

Having thus described my invention, I claim:

1. A method of removing a torsion spring from a winding cone to which the spring is torque locked comprising the steps of applying a torsional force to a terminal end of said spring on said cone, said torsional force acting counter to the torsion lock while simultaneously applying a lifting force which moves said terminal end of said spring radially outwardly away from said cone.

2. Apparatus for removing a torsion spring from a winding cone to which the spring is torque locked comprising means for applying a torsional force to a terminal end of said spring on said cone further including means for simultaneously applying a radially outwardly directed lifting force to said terminal end of said spring.

3. The apparatus as set forth in claim 2 wherein said means for applying torsional and lifting forces includes a claw having a concave pocket therein adapted to positively engage and lift said terminal end of said spring.

4. The apparatus as set forth in claim 3 wherein said means for applying a torsional force further includes a lever arm.

5. The apparatus as set forth in claim 4 wherein said claw and said lever arm are connected by an adjustable length chain.

6. The apparatus as set forth in claim 5 wherein said adjustable length chain is attached to said claw at a point intermediate its length and a tail portion of said claw located opposite said concave pocket from said point is in abutment against an adjacent portion of said chain.

* * * * *